United States Patent [19]
Resnikoff et al.

[11] Patent Number: 4,574,311
[45] Date of Patent: Mar. 4, 1986

[54] RANDOM ARRAY SENSING DEVICES

[75] Inventors: Howard L. Resnikoff, Boston; Tomaso Poggio, Wellesley; Karl Sims, Boston, all of Mass.

[73] Assignee: Thinking Machines Corporation, Cambridge, Mass.

[21] Appl. No.: 720,017

[22] Filed: Apr. 4, 1985

[51] Int. Cl.[4] ............................................. H04N 5/22
[52] U.S. Cl. .................................... 358/213; 358/212
[58] Field of Search ................ 250/578; 358/213, 212, 358/209; 382/66, 67

[56] References Cited

U.S. PATENT DOCUMENTS

| | | | |
|---|---|---|---|
| 3,629,827 | 12/1971 | John et al. ........................... | 382/66 |
| 3,711,831 | 1/1973 | Kaneko et al. ...................... | 382/66 |
| 4,011,401 | 3/1977 | Presti .................................. | 358/212 |
| 4,150,873 | 4/1979 | Dali ..................................... | 358/285 |

OTHER PUBLICATIONS

Beutler, Frederick J. "Error-Free Recovery of Signals from Irregularly Spaced Samples," SIAM Review vol. 8, No. 3, Jul. 1966, pp. 328–335.
Beutler, Frederick J. "Alias-Free Randomly Timed Sampling of Stochastic Processes," Trans. Info. Theory, vol. IT-16, No. 2, Mar. 1970, pp. 147–152.
Hall, James A. "Arrays and Charge Coupled Devices," Chap. 8 Applied Optics and Optical Engineering, vol. VIII, Academic Press 1980.
Jerri, A. J. "The Shannon Sampling Theorem—Its Various Extensions and Applications: A Tutorial Review," Proc. IEEE, vol. 65, No. 11, Nov. 1977, pp. 1565–1596.
Nishihara, H. K. & Larson, N. G. "Toward a Real-Time Implementation of the Marr and Poggio Stereo Matcher" Proc. DARPA Image Understanding Workshop, L. Baumann, ed., Science Applications, Inc. 1981, pp. 114–120.
Metropolis et al., "Equation of State Calculations by Fast Computing Machines," J. Chemical Physics, vol. 21, No. 6, Jun. 1953, pp. 1087–1092.
Shapiro, H. S. & Silverman, R. A. "Alias-Free Sampling of Random Noise" J. Soc. Industrial and Appln. Math. vol. 8, No. 2, Jun. 1960, pp. 225–248.
Yellott, J. "Spectral Consequences of Photoreceptor Sampling in the Rhesus Retina" Science, vol. 221, Jul. 1983, pp. 382–385.
Yellott, J. "Spectral Analysis of Spatial Sampling by Photoreceptors: Topological Disorder Prevents Aliasing," 1981.
Yellott, J. "Arvo Talk," May 4th, 1983 (Abstract published in Investigative Opthamology and Visual Science, supplement to vol. 24, No. 3, p. 147, 1983).
CCD Fundamentals, Fairchild publication (undated).

*Primary Examiner*—Gene Z. Rubinson
*Assistant Examiner*—Robert G. Lev
*Attorney, Agent, or Firm*—Spencer & Frank

[57] ABSTRACT

A sensing device for generating an output signal corresponding to an input signal which comprises a substrate, an array of sensor elements for receiving the input signal and transfer members located on the surface of the substrate and interposed between the sensor elements. The sensor elements have their barycenters distributed on the surface of the substrate in a random non-periodic pattern. The transfer members are coupled to the sensor elements and generate the output signal.

The sensing device is incorporated in an apparatus which generates an output signal from an input image wherein the output signal is substantially free of detectable aliases. The apparatus includes an image pick-up device for viewing the input image and transmitting radiation to the image sensing device, an analog-to-digital converter for converting the analog signal from a sensing device to a digital signal, a position encoder, an interpolator and a memory means for storing the output of the interpolator. The position encoder is provided with a plurality of storage addresses for storing digital signals each having a value corresponding to the intensity of the radiation incident on a corresponding sensor element, and the interpolator generates a plurality of signals corresponding to intensity values intermediate to those stored in the storage addresses of the position encoder.

20 Claims, 20 Drawing Figures

RANDOM ARRAY SENSING DEVICES

BACKGROUND OF THE INVENTION

This invention relates to sensing devices and, in particular, to sensing devices which minimize low frequency noise and the generation of detectable aliases.

Any device used to sample a signal has a maximum sampling rate that is determined by the physical characteristics of the device. This maximum sampling rate is related to the bandwidth of the device.

If a signal is sampled at a constant sampling rate and at uniformly and equally spaced intervals, the high frequency variations of the signal that occur between successive samples cannot be correctly detected. The power that corresponds to the undetected signal variations will be conflated with power that corresponds to lower frequency variations, thereby resulting in distortions of the sampled signal values. These distortions are called aliases.

If a signal does not contain power in frequencies greater than one-half the sampling rate, it can be reconstructed exactly from its sampled values. Conversely, if the signal does contain power in frequencies greater than one-half the sampling rate, the signal can not be reconstructed from its sampled values. Moreover, in the latter case, aliases are often significant features of the signal, resulting in false and often misleading information being incorporated in the signal.

Figure 1:
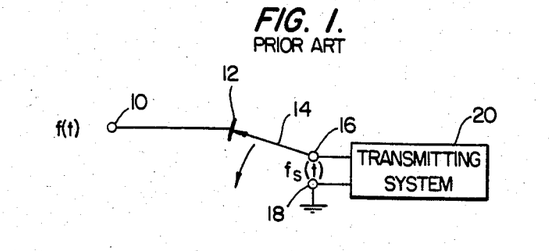
FIG. 1 is a schematic diagram of a sampling device used for illustrating the process of sampling a signal.

The phenomenon of aliasing can be understood from a study of FIGS. 1-4. In FIG. 1, a continuously varying signal f(t) is applied to an input terminal 10 which is connected to an elongated switch segment 12 A switch arm 14, which rotates at a sampling rate of $f_c$ times per second, makes contact with the segment 12 for $\lambda$ seconds during each rotation. As a result, a sampled version of f(t), output signal $f_s(t)$, is applied across the input terminals 16, 18 of a transmitting system 20. In practice, the sampling process would be carried out electronically by switching the signal on and off but, for the purpose of explanation, a mechanical switch has been shown in FIG. 1.

Figure 2A:
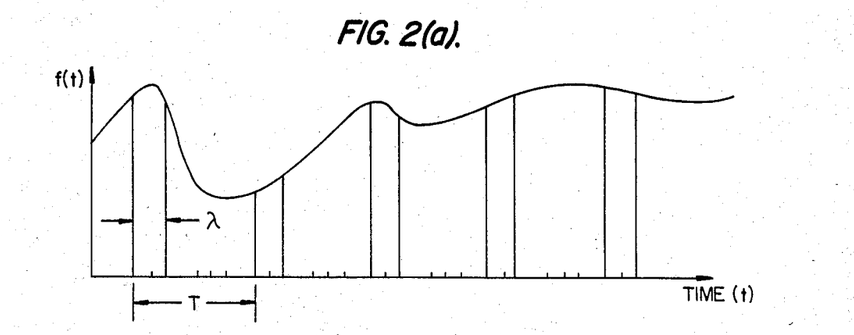
FIG. 2(a) shows the waveform of a signal applied to the input of the device of FIG. 1.
Figure 2B:
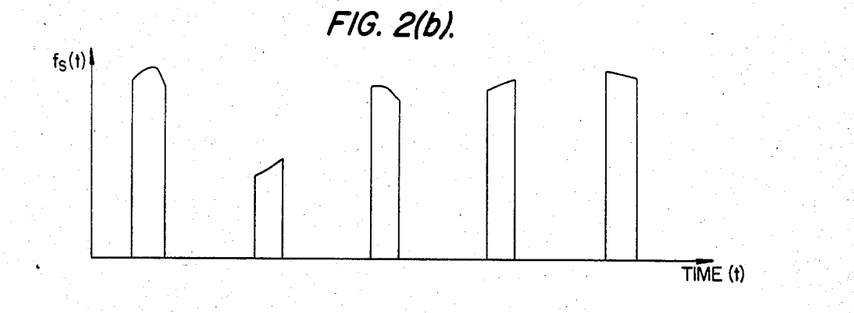
FIG. 2(b) shows the input signal after sampling and FIG. 2(c) is the Fourier transform of the input signal.

A typical signal f(t), which varies continuously as a function of time t, is shown in FIG. 2a. This signal is sampled at the rate $f_c$ such that the sampling interval $T = 1/f_c$ is much greater than the sampling time $\lambda$. The sampled output $f_s(t)$ is shown in FIG. 2(b).

Figure 2C:
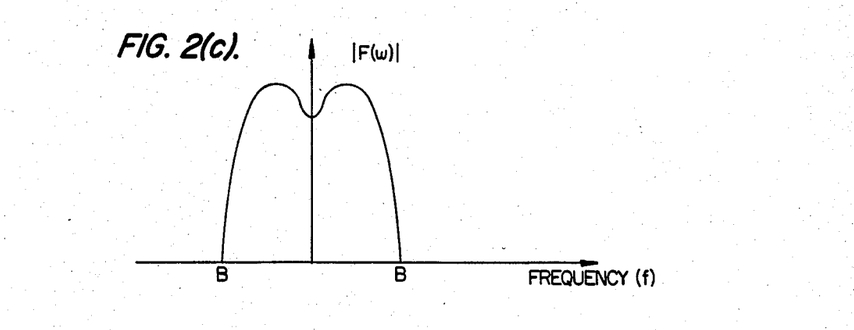

If the signal f(t) has no frequency components in its spectrum beyond f=B, where B is the bandwidth of f(r), the magnitude of its Fourier transform $F(\omega)$ would be as shown in FIG. 2(c), where $\omega = 2\pi f$.

Figure 3:
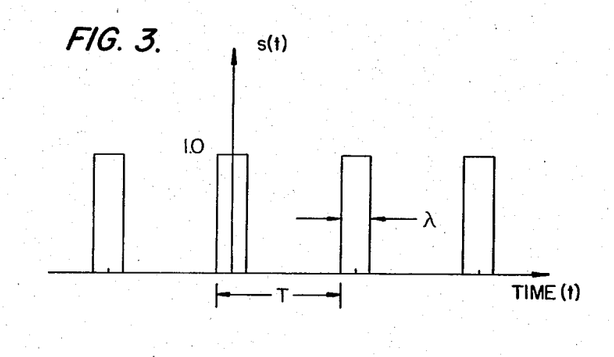
FIG. 3 is the switching function employed in the device of FIG. 1.

The sampled signal $f_s(t)$ can be represented in terms of f(t) by the relation $$f_s(t) = f(t)s(t),$$

where s(t) is a periodic switching function consisting of a series of pulses of unit amplitude, width $\lambda$ and period $T = 1/f_c$. This switching function is shown in FIG. 3.

The Fourier transform $F_s(\omega)$ of the sampled signal $f_s(t)$ is given by the convolution of the Fourier transforms $F(\omega)$ and $S(\omega)$ of the signal f(t) and the switching function s(t), respectively. It is shown in FIG. 4 where the abscissa is plotted in units of frequency f and the ordinate is the Fourier transform $F_s(\omega)$.

Figure 4:
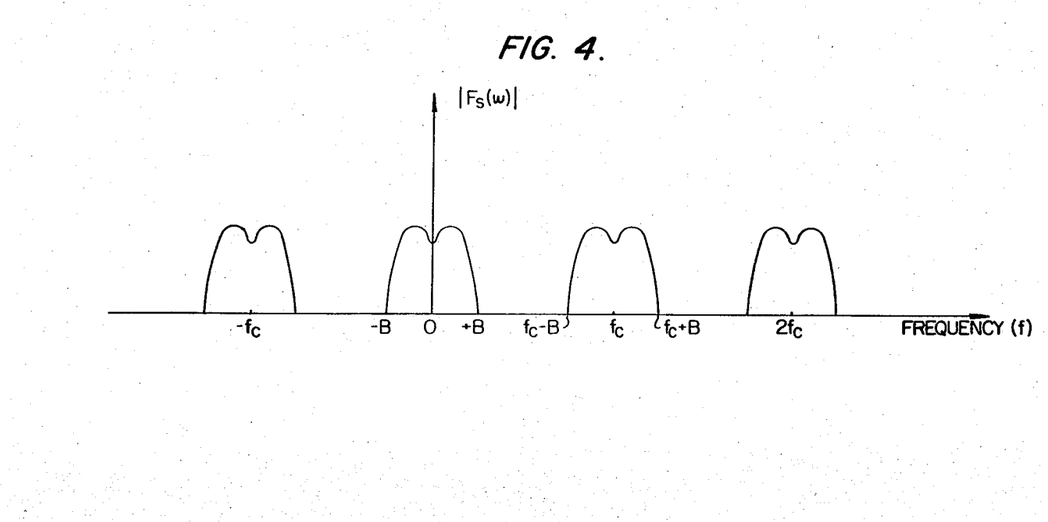
FIG. 4 is the Fourier transform of the sampled signal of FIG. 2(b).

It can be seen from the amplitude spectrum of FIG. 4 that an input signal f(t) which does not contain frequencies higher than $B = f_c/2$ can be filtered from $f_s(t)$ by the use of a low pass filter that cuts off sharply before reaching the frequency spectrum centered at $f_c$. However, if the speed with which switch arm 14 rotates is decreased, the frequency $f_c$ and all its harmonics close in on one another and eventually the spectral components of FIG. 4 overlap and merge.

In particular, the component $F(\omega - \omega_c)$, centered about $f_c$, would merge with the unshifted $F(\omega)$ term centered about the origin. It would then be impossible to separate out $F(\omega)$, and consequently f(t) could not be separated from $f_s(t)$. The distortions resulting from these overlapping spectra caused by taking samples at too widely spaced intervals are the aliases defined above. The limiting frequency at which $F(\omega)$ and $F(\omega - \omega_c)$ merge is $F_c = 2B$, which is called the Nyquist sampling rate.

Next, considering the nature of images, an image is a distribution of light or other form of radiation over a surface, generally a plane rectangle such as the face of the cathode ray tube of a television receiver. Television receivers effectively display a sampled version of the image recorded by a video camera on 480 horizontal scan lines that are clearly visible to the eye when one is close to the television screen being viewed. The television picture does not accurately discriminate spatial variations in the vertical direction that correspond to distances less than twice the distance between successive scan lines, that is, of spatial frequencies greater than half the 480 line per screen sampling rate of the standard NTSC American broadcast television. This results in aliases which appear as moiré patterns when objects such as striped shirts, which exhibit spatial frquency variations greater than the Nyquist rate, are sampled by the video camera and reproduced by the receiver.

Because the bandwidth of the television broadcast signal is limited, discrimination of variations in the horizontal direction, along the scan lines, is also limited, and contributes to the creation of aliases.

Modern video cameras often use a rectangular array of regularly spaced light sensors, such as uniformly distributed arrays of charge-coupled devices (CCD), to capture an image and either store, or broadcast, it for further distribution to television receivers. The limited rate of spatial sampling of present CCD-imaging array video cameras results in aliases when certain scenes are imaged. Aliases in general, and image aliases in particular, can produce striking artifacts that cannot alWays be distinguished from real features of the signal. In addition to causing confusion, aliases may result in errors which can be costly, time-consuming or both.

As an example, consider a computer-generated image consisting of a square array of $512 \times 512 = 262,144$ picture elements, called "pixels," each of which is a gray level specified by an 8-bit code. The code 00000000 corresponds to black and the code 11111111 to the brightest light level that can be produced by the imaging apparatus. Thus there are $2^8 = 256$ distinct representable shades of gray, ranging from black to white. Spatial variations that occur within distances less than the width of a pixel cannot be accurately represented by this image.

If such an image were sampled by a device that measures the gray level of pixels that form a square lattice consisting of every fifth pixel in both the horizontal and vertical direction, then this uniformly sampled version of the image would consist of about 10,000 values and contain only about 4% of the amount of information in the original image. Gray levels for intermediate pixels could be interpolated, for instance, by linear or by Gaussian interpolation. However, the interpolated result could show numerous strong alias artifacts.

It is not possible to both eliminate aliases and permit faithful reconstruction of the image signal without increasing the rate of spatial sampling so that all power in the signal lies in spatial frequencies that are less than the Nyquist frequency, i.e., less than one-half the sampling frequency. However, if the sampling frequency is held fixed, then the effects of aliasing can be diminished or even eliminated in special cases, either by (1) bandlimiting the signal before sampling in order to eliminate high frequency power (e.g., by blurring the image before sampling), or (2) distributing the power that arises from the high spatial frequencies throughout the spatial frequencies that are less than the Nyquist frequency, rather than concentrating that power among a small number of low frequencies or ranges of low spatial frequencies. The redistributed power is perceived as noise rather than as aliases in the image.

It has been shown that aliases can be eliminated entirely in the statistical sense for a one-dimensional signal by sampling the signal at non-uniform intervals if the non-uniform intervals are chosen from a suitable probability distribution. In particular, it has been shown in Shapiro et al., "Alias-free sampling of random noise." *J. Soc. Industrial and Appl. Math.* 80 (1960), p. 225–248, that by selecting the sampling points at random from the uniform probability distribution until the desired average sampling rate is obtained, aliases are traded for a statistically uniform distribution of noise throughout the frequency domain. This sampling process is referred to as Poisson sampling because the distribution of the length of the intervals between successive samples is the Poisson distribution of statistical theory.

A sampled image is often intended to convey information about some real scene that it represents. In this case it is frequently important for the viewer to know that organized structures that appear in the image are faithful replicas of corresponding structures in the original scene, insofar as the bandwidth of the imaging system permits them to be represented. In such situations it is generally more helpful to the viewer if high frequency spatial information corresponding to power above the Nyquist frequency is represented by noise rather than by alias artifacts.

Figure 5A:
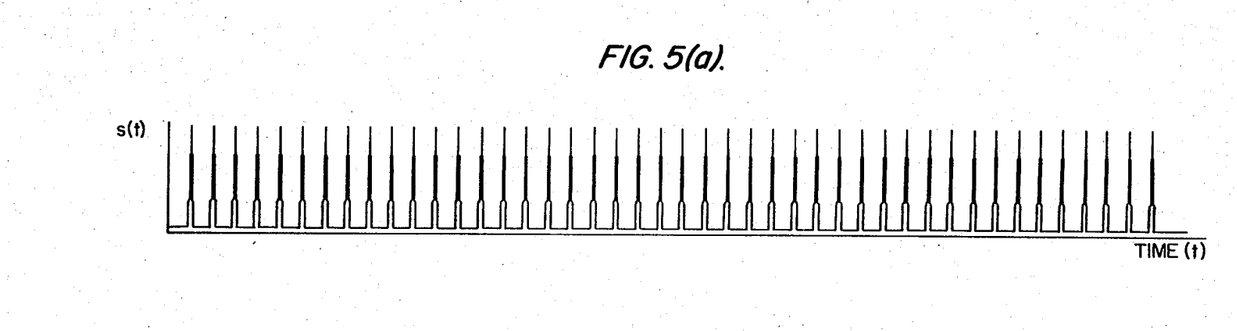
FIG. 5(a) is a uniform sampling function and FIG. 5(b) is the power spectrum of the sampling function of FIG. 5(a).
Figure 5B:
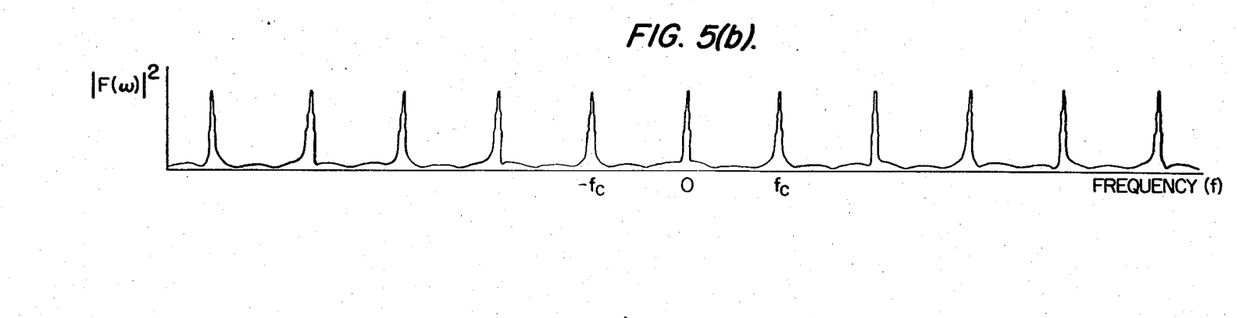

The degree to which a particular sampling process will produce aliases or noise can be determined by an analysis of the Fourier transform of the sampling distribution according to standard and well known techniques. FIGS. 5(a) and 5(b) show such an analysis for a uniform sampling of a one-dimensional signal. FIG. 5(a) displays the sampling function s(t), which consists of a uniformly spaced sequence of sampling spikes each of which is the numerical approximation of a Dirac delta function. The Fourier transform of the sampling function s(t) is $F(\omega) = |F(\omega)| \epsilon^{-j\theta(\omega)}$, where $\theta(\omega)$ is the phase of the Fourier transform of the sampling function measured in radians. FIG. 5(b) shows the power spectrum $|F(\omega)|^2$, that is, the square of the absolute value of the Fourier transform of the sampling function exhibited in FIG. 5(a). In this frequency domain representation of the sampling function, a frequency of zero Hz corresponds to the coordinate that lies under the central peak of FIG. 5(b), and the Nyquist frequency corresponds to the coordinates labelled $-f_c$ and $f_c$.

Aliases are produced by the sampling function when the Fourier transform of the signal extends beyond the Nyquist frequency, i.e., when it overlaps a copy of itself that has been shifted so as to be centered over the peaks in FIG. 5(b) adjacent to the central peak at zero Hz. The magnitude or strength of the alias produced by a peak is proportional to the product of the power in the signal at the frequency of the peak and the magnitude of the peak itself. Since the peaks in the magnitude of the Fourier transform of a uniform sampling function are all of nearly equal height, and would be exactly the same height if the number of sample points were infinite, the magnitude of the aliases depends primarily on the amount of power in the signal at the frequency of the peaks.

This analysis of the uniform sampling process that corresponds to FIGS. 5(a) and 5(b) shows that it will produce strong aliases for signals that have power in frequencies greater than half the sampling rate.

SUMMARY OF THE INVENTION

In the present invention, the rectangular array of regularly spaced light sensors used in conventional video cameras to receive input radiation defining an image is replaced by a pseudo-random array of sensor elements. The term "pseudo-random" is used because, while the distribution of the sensor elements in the array is random, the distribution is arrived at by using specific algorithms to be disclosed hereinafter. In this description, the terms "pseudo-random" and "random" are used interchangeably. Also, while the invention is specifically described in connection with a video camera which receives input radiation in the form of light, it is not limited to receiving radiation in the visible portion of the electromagnetic spectrum. Further, the invention is not limited to two-dimensional arrays.

In contrast with the regular periodic distribution of sensors employed in known video cameras, the sensors of our invention are arranged on a substrate with their barycenters, that is, their centers of mass, randomly located according to predetermined rules to form a non-periodic distribution. Transfer members coupled to the sensor elements generate an analog output signal having a magnitude corresponding to the intensity of the radiation incident on the sensor elements.

The output signal generated by the random sensor array is free of aliases but is undersampled. To obtain a high resolution digital image for display or processing, the analog signal is digitized, encoded, interpolated and stored. In particular, the analog output signal from the sensor array is converted to a digital signal in an analog to digital converter and then coupled to a position encoder. The position encoder includes a storage having a plurality of addresses, each of which correspond to the position of a sensor in the array. It associates each address with the intensity of the radiation incident on the corresponding sensor.

The interpolation stage accepts the output of the position encoder and calculates image intensity values on a high resolution array which are intermediate to the image intensity values provided by the sensors and stored at the storage addresses of the encoder. The output of the interpolator is stored in a high resolution frame buffer memory having an output in the form of a low-noise alias-free signal which can be used for further processing or for display.

A method of manufacturing the sensing device of this invention comprises the steps of randomly generating a series of numbers corresponding to the coordinates of points on the substrate relative to a fixed position until the number of points corresponds to a desired sampling rate. The barycenter of each sensor element is then located at one of these points, and the areas of the sensor elements selected to provide isolation of each element from its adjacent elements. To provide uniform response, the areas of the sensor elements must be substantially equal to each other. This method produces an array of sensors on the substrate having a Poisson distribution.

The randomly distributed sensor elements can be divided into sensor element groups, each group extending in a polygonal or curved line which is one sensor element wide. A transfer member is interposed between each of these groups, and all of the sensor elements in a group are connected to that transfer member.

The Poisson sampling process eliminates aliasing by distributing high frequency power throughout the lower frequencies rather than concentrating it at specific frequencies or in specific frequency bands. If the uniform sampling of FIG. 5(a) were replaced by Poisson sampling, the power spectrum of FIG. 5(b) would be replaced by a spectrum having a tall central peak corresponding to zero Hz with the remainder of the spectrum exhibiting a random fluctuation about a constant height. That is, the power that corresponds to frequencies other than zero Hz would fluctuate about a constant value that is significantly smaller than the value of the peak at zero Hz, and the phase of the Fourier transform of the sampling function would vary randomly between zero and $2\pi$ radians. Power in frequencies in the signal other than zero Hz is scattered roughly equally throughout all frequencies by the Poisson sampling process with the consequence that the sampled signal, corresponding to the tall central peak at zero Hz, is seen against a background of noise.

Although the Poisson sampling process avoids the creation of alias artifacts by scattering power into noise throughout all frequencies, the magnitude of the low frequency noise tends to interfere with perception of the low frequency components of the signal.

In another embodiment of the invention, the relative magnitude of the low frequency noise is reduced while avoiding the introduction of perceptible aliases. This embodiment employs a Poisson disc sampling process for establishing the distances between the points on which the barycenters of the sensors elements are located. In this process, the sampling array is obtained by selecting the sampling points at random until the desired sampling rate is obtained, as in generating the array of sensors having a Poisson distribution, but subject to the additional condition that adjacent sampling points are separated by a distance equal to or greater than d pixel units, where d is a constant.

The Poisson disc sampling array trades the production of aliases for noise in the reconstruction of a sampled image. It shares with the Poisson sampling array the desirable property of reducing or eliminating aliases but has the advantage of producing less noise below the Nyquist frequency.

There are other sampling arrays that avoid aliases and have a greater signal-to-noise ratio than the Poisson disc array for frequencies less than the Nyquist frequency. These arrays are characterized by Fourier transforms that have low noise power at frequencies less than the sampling frequency (like the regular sampling array of FIG. 5), nearly constant average power at higher frequencies, and irregularly varying phase. Arrays that possess these properties can be constructed by suitably modifying the positions of the sampling points of a Poisson disc array in order to decrease the power at low frequencies while limiting the maximum power at frequencies different from zero hertz.

DESCRIPTION OF THE PREFERRED EMBODIMENTS

Figure 6:
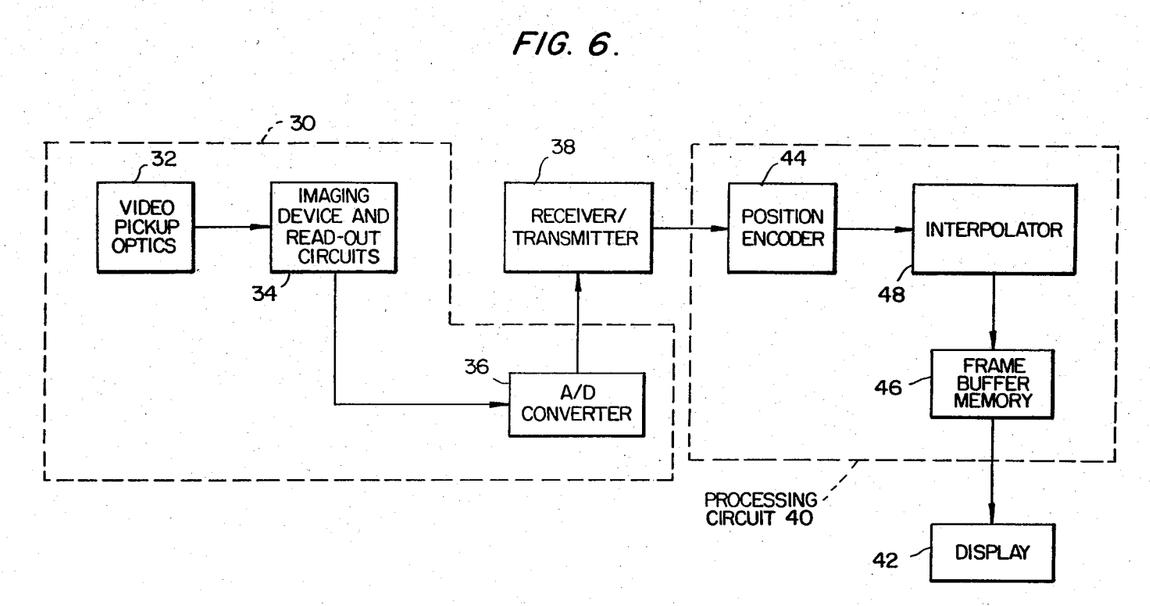
FIG. 6 is a block diagram of the invention.

FIG. 6 is a block diagram of a random sensing array imaging system. An image is captured by a video camera 30 which comprises video pickup optics 32, a novel imaging device 34 which samples the captured image and reads out the sampled output, and an analog-to-digital converter 36. The output of the A/D converter 36 is a digital signal that is coupled to a receiver/transmitter 38 which either stores the image or transmits it to a processor 40 where it is encoded, interpolated in a high resolution array and stored for display on a monitor 42.

Video camera 30 employs the standard packaging and video pickup optics 32 used in commercially available cameras such as the Hitachi Model KP 231. It includes an imaging device 34 which is similar to the Fairchild CCD 221 in that it comprises an array of charge-coupled devices as sensor elements, transfer members and the standard read-out electronics used with the commercially available equipment. The imaging device 34 of this invention differs from conventional two-dimensional CCD area-imaging devices in that the array of CCD sensing elements is not a regular lattice; rather, it is a pseudo-random array of such elements.

Figure 7:
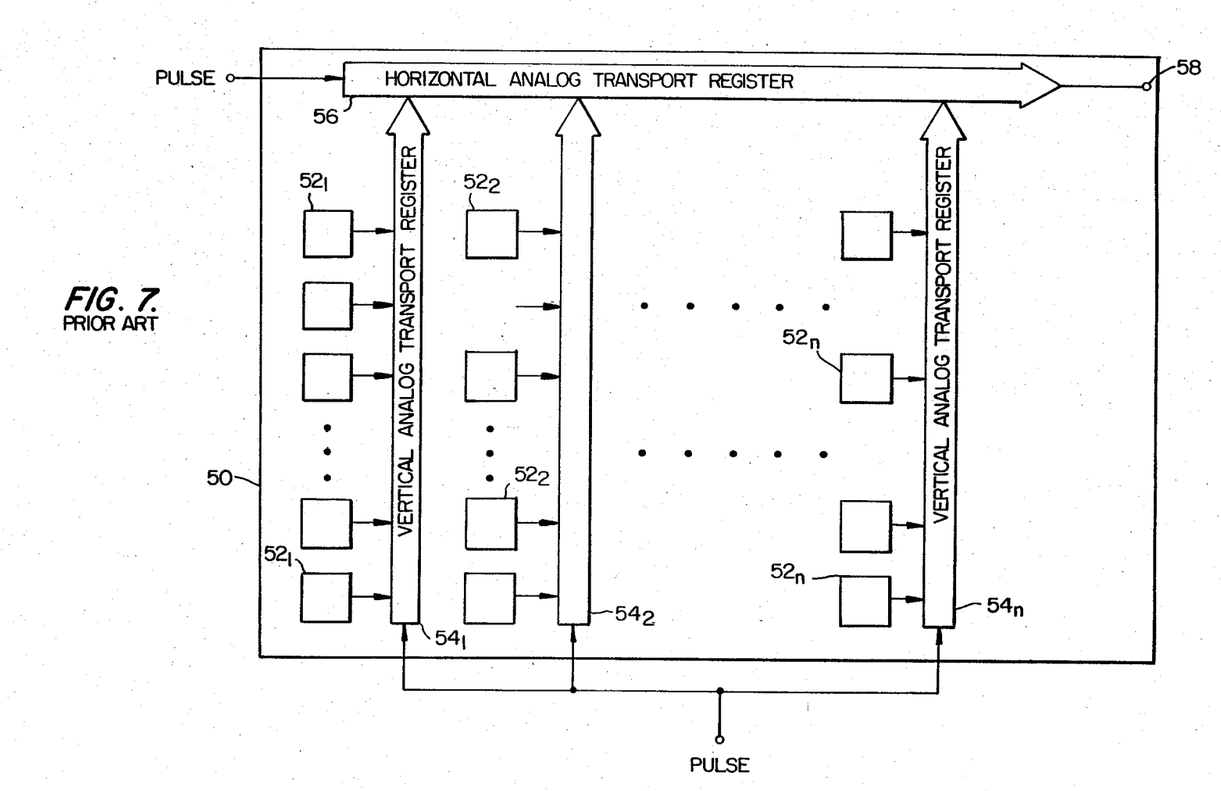
FIG. 7 is a schematic diagram of a known imaging device.

FIG. 7 is a schematic diagram of a conventional charged-coupled area-imaging device such as the Fairchild CCD 221. It comprises a silicon substrate 50 having an array of sensing elements $52_1$, $52_2$ ... $52_n$ arranged in regular rows and columns. In a typical array, n equals 488 rows, or groups, of sensing elements with 380 elements per group. Vertical analog transfer registers $54_1$, $54_2$ ... $54_n$ are located between each of the groups of sensors with the sensor elements $52_1$ being connected to transfer register $54_1$, sensor elements $52_2$ to transfer register $54_2$ and sensor elements $52_n$ to transfer register $54_n$. A horizontal analog transport register 56 receives the outputs of the vertical registers.

When radiation is incident on a sensor element 52, it is absorbed in the silicon causing the generation of a linearly proportional number of free electrons (called a charge-packet) in the specific area illuminated. The pattern of incident radiation intensity is a focused light image from the video pickup optics 32 viewing a scene and therefore the charge-packets created in the finite illuminated areas of the array are a faithful reproduction of the scene projected on its surface.

After an appropriate exposure time during which the incident light on each sensor element $52_1$, $52_2$ ... $52_n$ generates a time and intensity proportional electron charge-packet, the charge-packets are simultaneously transferred by charge-coupling to the corresponding parallel vertical analog transport registers $54_1$, $54_2$ ... $54_n$. Each charge-packet corresponds to a pixel, and when transferred to the adjacent vertical transport register continues to faithfully represent the total sensed radiant energy which was absorbed in the sensor. The vertical transport registers 54, which are loaded with lines of picture information in the form of charge-packets from the lines of sensors 52, are rapidly clocked by a pulse input to deliver the picture information in serial format to the horizontal analog transport register 56. At the same time, the sensors 52 begin integrating the next line of incident image information.

The horizontal analog transport register 56, upon receipt of a pulse input, outputs at terminal 58 an entire field of video information from each integration period in the form of a series of lines of video signal. This signal is converted from analog to digital form in a conventional low-noise, 8-bit A/D converter.

Figure 8:
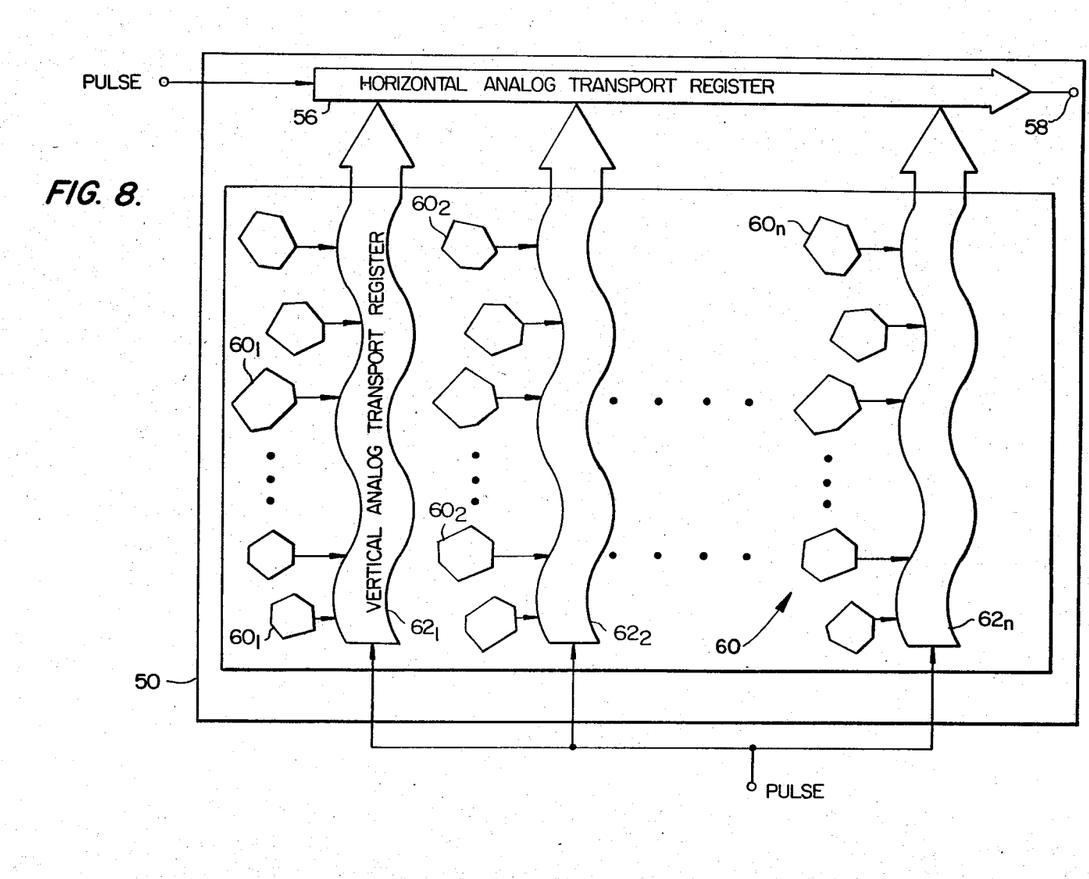
FIG. 8 is a schematic diagram of the imaging device of the present invention.

FIG. 8 is a schematic diagram of the present invention in which the regularly distributed sensors 52 of the prior art device of FIG. 7 have been replaced by randomly distributed sensors 60 having irregular shapes, and in which the linear vertical analog transport registers 54 of FIG. 7 have been replaced by serpentine registers 62 which are interposed between the groups of sensors and generally conform to their contours. More specifically, the group of sensor elements designated $60_1$ are connected to vertical analog tranaport register $62_1$, the group of sensor elements $60_2$ to transfer register $62_2$ and the group of sensor elements $60_n$ to transport register $62_n$. The operation of the sensor device of FIG. 8 is the same as that described for the conventional device of FIG. 7.

Figure 9A:
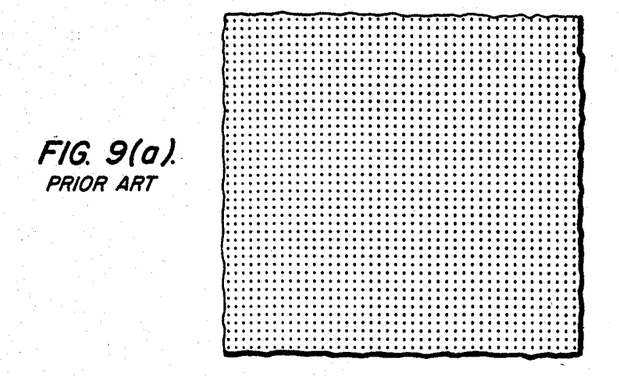
FIG. 9(a) shows the barycenters of the sensors of the known imaging device of FIG. 7 and FIG. 9(b) the barycenters of the sensors of the imaging device of FIG. 8.
Figure 9B:
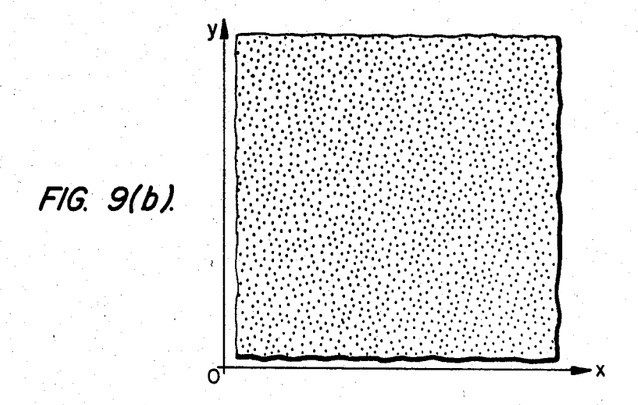

The distinction between the area-imaging device of the present invention and a conventional area-imaging device is further illustrated by FIGS. 9(a) and 9(b). FIG. 9(a) shows a portion of a conventional square lattice uniform array having 10,404 points which correspond to the barycenters of the sensors 52 of FIG. 7.

FIG. 9(b) is a portion of a Poisson disc sampling array which consists of 10,697 sample points selected from the 262,144 pixels of a 512×512 pixel array.

Figure 10:
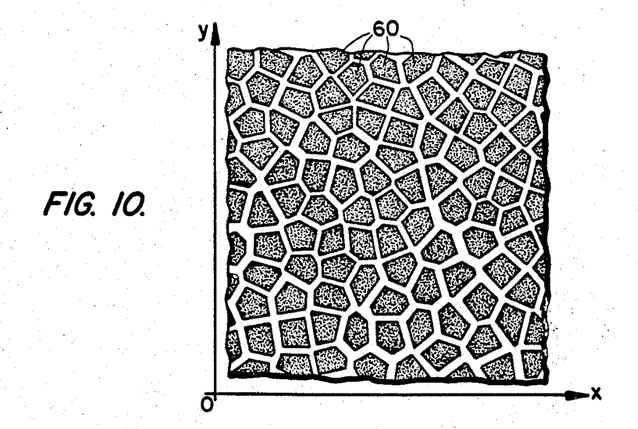
FIG. 10 illustrates the sensor array of the imaging device of the invention.

A portion of a sensor array in which the sensor elements 60 have a Poisson disc distribution is shown in FIG. 10. The vertical analog transport registers 62 of FIG. 8, which follow curved paths corresponding to the contours of the sensors 60, have been omitted from FIG. 10 for clarity.

The Poisson disc sampling process which produced the random distribution of FIG. 9(b) is carried out by selecting points in a plane at random using the uniform probability distribution, subject to the constraint that each point of the array must be at least a distance d pixel units from every other point of the array. In the specific example of FIG. 9(b), d is equal to 4. The Cartesian coordinates of the barycenters of the sensor elements 60 of FIG. 10 are the same as the coordinates of the corresponding discrete sparse lattice points of FIG. 9(b).

In FIG. 9(b), the barycenters of the sensor elements 60 are indicated by an array of dots each of which can be considered to have coordinates x, y with respect to the origin O of orthogonal axes x and y. The origin of the axes has been placed at the lower left of the illustrated portion of the array to simplify the explanation but could be located at any other convenient reference point. The positions of the barycenters are determined by selecting at random numbers corresponding to distances along the x and y axes, which are then plotted as a plurality of points randomly distributed over a plane representing the surface of the substrate 50. In order to obtain the Poisson disc distribution of FIGS. 9(b) and 10, those points which are separated by a distance less than d=4 pixel units are discarded so that the remaining points are at a distance equal to or greater than 4 pixel units from each other. If the limitation that the points be at least d pixel units from each other is not imposed on the array, the Poisson distribution is obtained.

The process of generating points on the array continues until the barycenters of the minimum number of sensors required have been defined. The minimum number of sensors is determined by the desired bandwidth, the available area of the device and the sensor area required to provide the necessary sensitivity.

Figure 11:
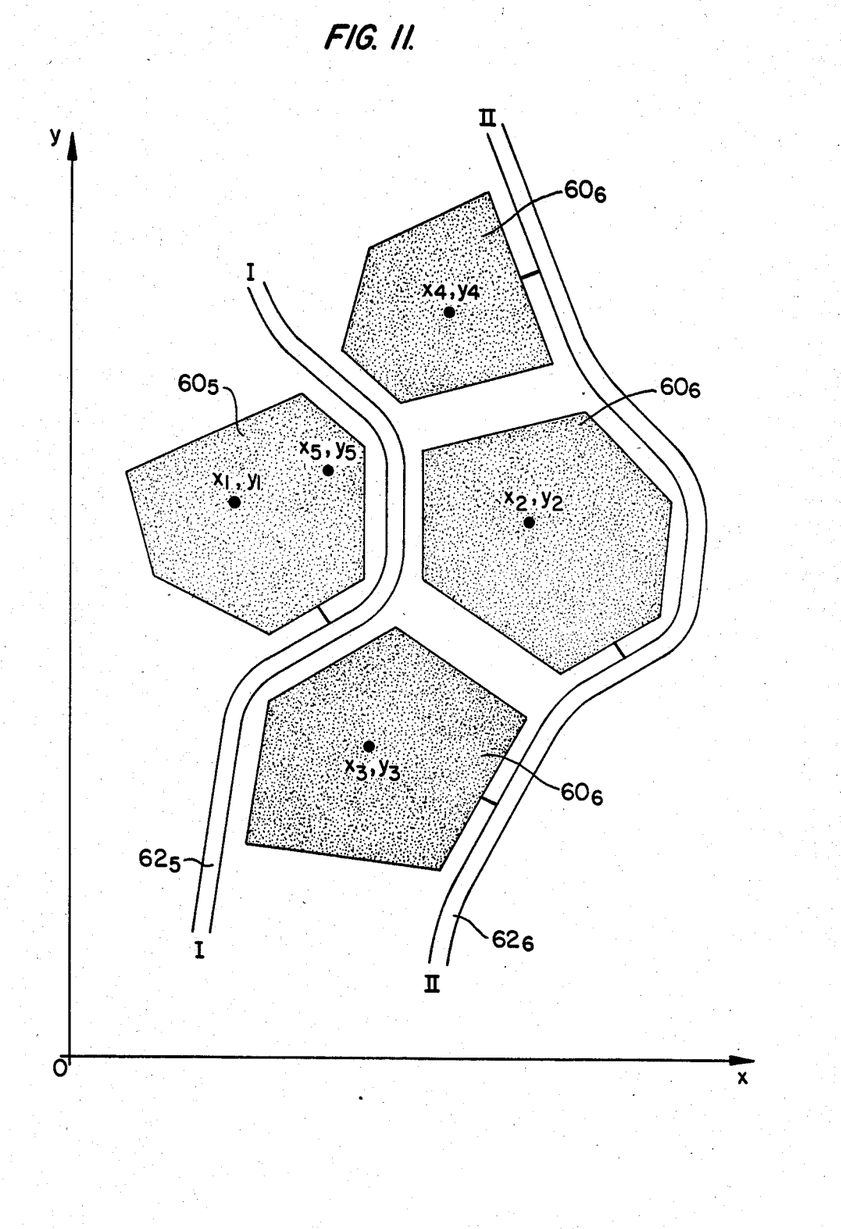
FIG. 11 is a detailed view of sensors within the array of FIG. 10.

FIG. 11 shows an enlarged portion of FIG. 10 which arbitrarily illustrates a sensor element $60_5$ belonging to a group of sensors connected to a vertical analog transport register $62_5$ and three sensor elements $60_6$ belonging to a group of sensors connected to a vertical analog transport register $62_6$. Only the portion of the register $62_5$ between points I—I and the portion of the register $62_6$ between points II—II are shown but it will be understood that there is a large number of sensor elements $60_5$ connected to the vertical register $62_5$ and a similarly large number of sensor elements $60_6$ connected to the vertical register $62_6$. The vertical analog transfer registers 62 correspond to those illustrated schematically in FIG. 8.

The barycenters of the four sensor elements $60_5$ and $60_6$ shown in FIG. 11 have coordinates $(x_1,y_1)$, $(x_2,y_2)$, $(x_3,y_3)$ and $(x_4,y_4)$ with respect to the origin O of the x and y axes. The areas of the sensor elements are selected to provide isolation of each element from adjacent elements. Further, the area of the smallest sensor is determined and then all of the other sensor elements are reduced in size until they have the same area as the smallest sensor.

The sensor elements 60 are formed on a silicon substrate 50 having a silicon dioxide insulating layer (not shown), as in a conventional area-imaging device such as the Fairchild CCD-221. However, since the barycenters of the sensor elements are distributed in a non-periodic arrangement, the perimeters of the elements are irregular and space is provided between the elements, as shown in FIG. 11, to accommodate the transfer registers. All of the sensor elements have substantially the same area to provide a uniform response.

The digital signal at the output of A/D converter 36 is coupled by a radio link or direct wire connection to the receiver portion of receiver/transmitter 38 and transmitted to the processor 40. Alternatively, the output of the imaging device may be stored as a videotape cassette recording, or on a videodisk, digital disc or other memory device, and the stored output provided to the processor.

The digital signal applied to position encoder 44 is an alias-free but undersampled signal, typically in the form of 8-bit words corresponding to the output of each sensor element of the imaging device 34. The position encoder contains a look-up table in which are stored the x,y coordinates of the sensors of the imaging device 34. The encoder provides to the interpolator 48 the coordinates and the magnitude of the output of each of the sensor elements of the imaging device 34. The interpolator uses these values to interpolate the image intensity values on a high resolution array.

Figure 12:
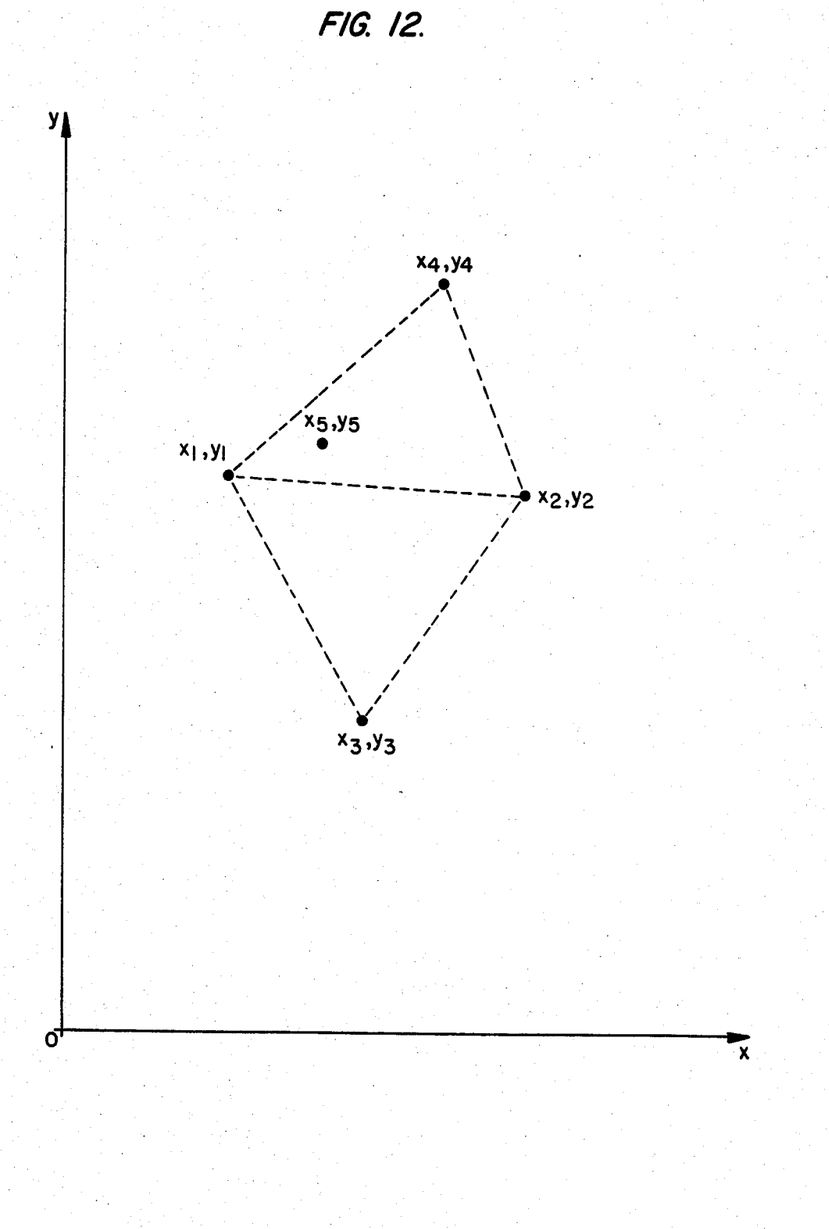
FIG. 12 is a diagram for explaining the interpolation process.

The coordinates provided to the interpolator 48 define a high resolution array corresponding to the underlying lattice of FIG. 9(b). FIG. 12 is a plot of four points which have the coordinates $(x_1,y_1)$, $(x_2,y_2)$, $(x_3,y_3)$ and $(x_4,y_4)$ which correspond to the barycenter of the sensors $60_5$ at $(x_1,y_1)$ and the barycenters of sensors $60_6$ at $(x_2,y_2)$, $(x_3,y_3)$ and $(x_4,y_4)$ shown in FIG. 11. The interpolator 48 generates outputs corresponding to intensity values intermediate to those applied to the position encoder 44 to provide additional pixel units for display on monitor 42.

While there are several known methods of interpolation, linear interpolation is computationally simpler than other methods and yields excellent results. In linear interpolation, the array of sensor elements is triangulated by connecting the points representing the barycenters of each of the sensors, as shown in FIG. 12 for four typical barycenters having the coordinates $(x_1,y_1)$, $(x_2,y_2)$, $(x_3,y_3)$ and $(x_4,y_4)$. Linear interpolation is then performed to obtain the value of each pixel of the high resolution array contained within each triangle by linearly combining the sensor output values corresponding to the vertices of the triangle. The intensity $I_5$ at a point $(x_5,y_5)$ within the triangle defined by the barycenters at $(x_1,y_1)$, $(x_2,y_2)$ and $(x_4,y_4)$ at which the intensities are $I_1$, $I_2$ and $I_4$, respectively, can be obtained, for example, from the following formula:

$$I_5 = I_1 + \frac{\{(y_4 - y_1)(I_2 - I_1) - (y_2 - y_1)(I_4 - I_1)\}(x_5 - x_1) + \{(x_2 - x_1)(I_4 - I_1) - (x_4 - x_1)(I_2 - I_1)\}(y_5 - y_1)}{(x_2 - x_1)(y_4 - y_1) - (x_4 - x_1)(y_2 - y_1)}$$

Computer programs have been written for implementing the triangulation step and for carrying out linear interpolation. Other forms of interpolation which can be used are Gaussian and cubic spline interpolation. Both the position encoder 44 and interpolator 48 are implemented by a microprocessor such as the Motorola 68000 with a RAM memory.

The output of the interpolation stage 48 is stored in the high resolution frame buffer memory 46. This memory, which may be a Symbolics Digitizing Frame Grabber, generates an output which is displayed on a monitor 42.

Figure 13:
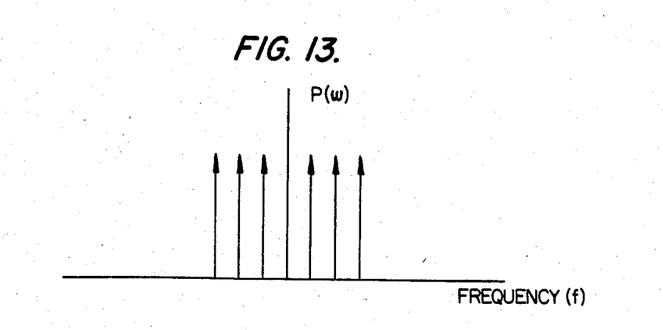
FIG. 13 illustrates a regular sampling power spectrum.
Figure 14:
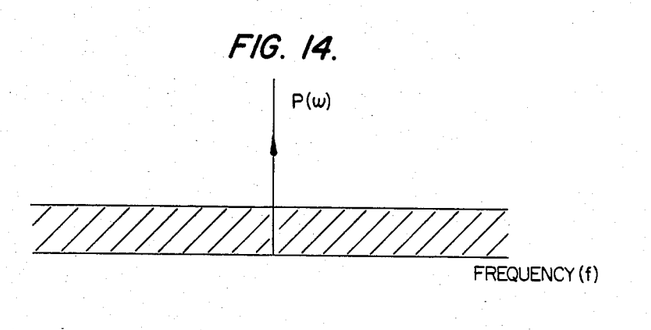
FIG. 14 shows an ideal power spectrum for the Poisson process.

An examination of the algorithms involved in pseudorandom sampling shows why the present invention provides a substantially alias-free low noise sampling array. It is known that the square of the modulus of the discrete Fourier transform of a sample function of a Poisson process tends in the limit of infinite length to the power distribution shown in idealized form in FIG. 13. The power spectrum $P(\omega)$ can be regarded as the square of the Fourier transform when the latter is real. The idealized power spectrum for the Poisson process, shown in FIG. 14, avoids aliasing at the expense of noise that becomes dominant at frequencies above the Nyquist rate but is present at all frequencies.

Figure 15:
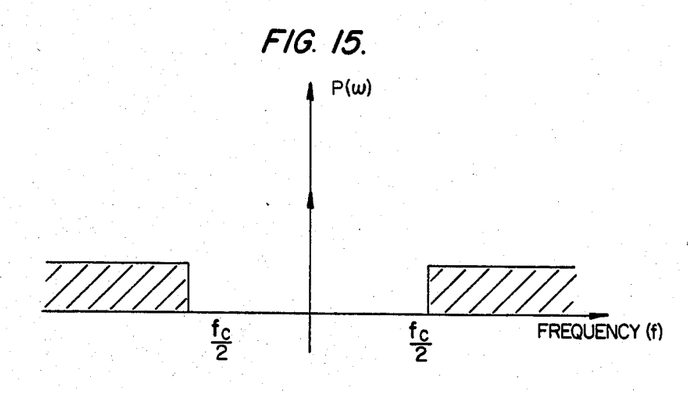
FIG. 15 illustrates the ideal power spectrum for alias-free sampling.

For some applications, this is a satisfactory method for eliminating aliases but a better sampling array would have a Fourier transform of the ideal form indicated by the power spectrum of FIG. 15. This would totally avoid noise for frequencies below $f_c/2$ and would also avoid aliasing, at the expense of noise, at frequencies above $f_c/2$, where $f_c$ is the rate at which the image signal is sampled. The Poisson disc process approaches the spectrum of FIG. 15.

In another embodiment of the alias-free sampling device, the density of the sensing elements is decreased monotonically with increasing radial distance from the center of the array. This version of the invention is particularly interesting for robotic vision applications.

Figure 16:
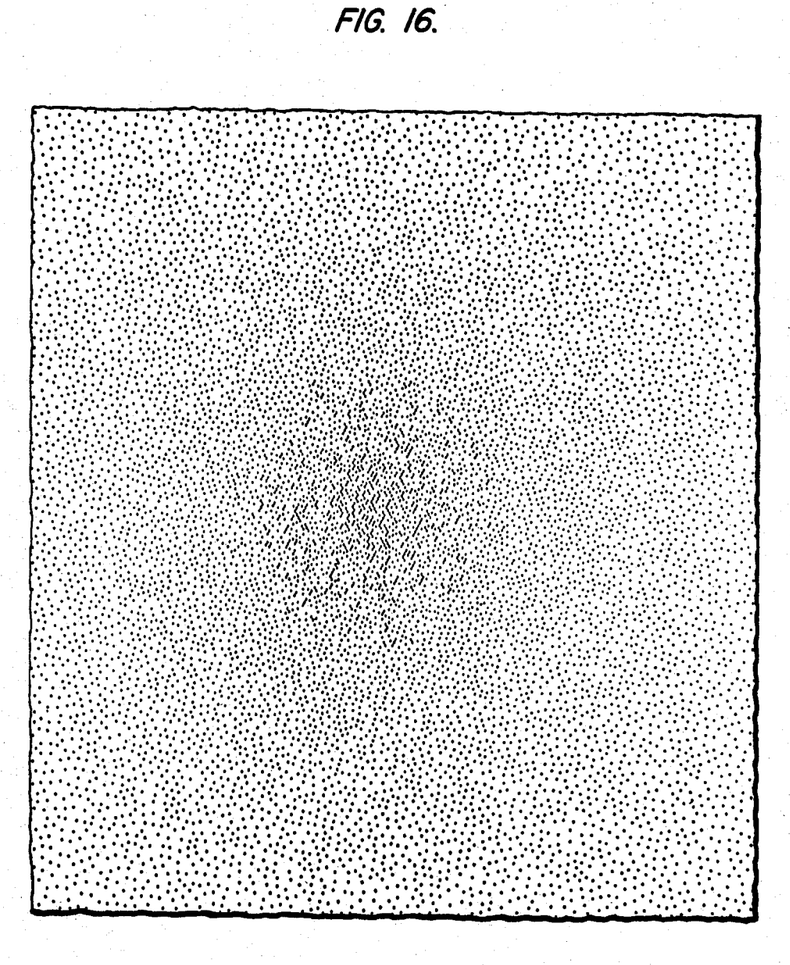
FIG. 16 is a typical space-variant two-dimensional alias-free sampling array.

The barycenters of sensor elements arranged in accordance with this embodiment are illustrated in FIG. 16. As shown, the sensor elements are densely packed near the center of the array, and are arranged non-regularly at the periphery. This embodiment employs the system shown in FIG. 6 and the area-imaging device of FIG. 8, the only differences being that the method of determining the location of the barycenters is modified and the interpolation must be space-variant.

The algorithm for generating a space-variant array with anti-aliasing properties is a generalization of the algorithm previously described for generating the Poisson disk distribution. It involves the following steps:

1. Place a point having coordinates (x,y) on an area array which already has at least one point at a random position. The coordinates of the point are measured relative to an origin at the center of the array.

2. Compute the distance function $d(r)=c+kr$, where $r=(x^2+y^2)^{\frac{1}{2}}$, c is the minimum distance between sensor centers and k is determined by the coarsest sampling desired at the boundaries of the array. Typically c would equal 1.5 and k would equal 0.01.

3. Determine whether the point (x,y) is at a distance larger than d(r) from its closest neighbor. If it is, store the coordinates of the point and return to step 1. If it is not, delete the point and return to step 1.

Summarizing, the invention provides an imaging device which generates a signal which is virtually free of detectable aliases and in which low frequency noise is minimized. This is achieved by arranging the sensor elements in a charge-coupled area-imaging device in a pseudo-random pattern, generating digital signals which correspond to radiation falling on the sensor array, obtaining intermediate intensity values by interpolation, storing the interpolated image and then displaying it on a monitor.

It will be understood that the above description of the present invention is susceptible to various modifications, changes and adaptations and the same are intended to be comprehended within the meaning and range of equivalents of the appended claims.

What is claimed:

1. A sensing device for generating an output signal corresponding to an input signal, comprising
   a substrate;
   an array of sensor elements for receiving said input signal, said sensor elements having their barycenters distributed on the surface of said substrate in a random, non-periodic pattern; and
   transfer members located on the surface of said substrate and interposed between said sensor elements, said transfer members being coupled to said sensor elements for generating said output signal.

2. A sensing device as defined by claim 1 wherein the barycenters of said sensor elements are separated by a distance which is greater than a predetermined number of pixel units.

3. A sensing device as defined by claim 2 wherein said predetermined distance increases with the distance of said barycenters from a predetermined point on the surface of said substrate.

4. A sensing device as defined by claim 1 wherein said array of sensor elements consists of a plurality of groups of elements each including at least one sensor element, and wherein the sensor elements of each group are coupled to an associated transfer member.

5. A sensing device as defined by claim 4 wherein said transfer members are positioned on the surface of said substrate along serpentine paths interposed between said groups of sensor elements.

6. A sensing device as defined by claim 1 wherein each of said transfer members is a vertical analog transport register.

7. A sensing device as defined by claim 6 which further comprises a horizontal analog transfer register, the output of said vertical analog transport registers being coupled to the inputs of said horizontal register.

8. A method of making a sensing device comprising an array of sensor elements having their barycenters randomly located on the surface of a substrate, comprising the steps of
   (a) randomly generating a plurality of numbers corresponding to the coordinates of points on said substrate relative to a fixed position thereon;
   (b) placing said sensor elements on said substrate with their barycenters at positions corresponding to said points, the area of each of said sensor elements being selected to provide isolation of said element from adjacent elements;
   (c) interposing transfer members between adjacent sensor elements on said substrate, and
   (d) connecting each of said sensor elements to one of said transfer members, a signal being generated at the output of said transfer member which corresponds to radiation falling on said sensor elements.

9. The method of making a sensing device as defined by claim 8 which comprises the additional step after step (a) of determining and discarding any point which is separated from an adjacent point by less than a predetermined amount, the barycenters of said sensor elements being located at the remaining points.

10. The method of making a sensing device as defined by claim 8 wherein step (b) includes the step of determining the area of the sensor element having the smallest area, and then reducing the areas of each of the remaining elements until their areas are the same as that of the sensor element having the smallest area.

11. The method of making a sensing device as defined by claim 8 wherein said array of sensor elements consists of a plurality of groups of elements each including at least one sensor element, and wherein in step (d) the sensor elements of each group are coupled to an associated transfer member.

12. A method of making a sensing device comprising an array of sensor elements having their barycenters randomly located on the surface of a substrate at points defined by the distances x and y from orthogonal reference axes, comprising the steps of
   (a) selecting a point having the coordinates x,y with respect to the intersection of said reference axes;
   (b) computing the distance $d(r)=c+kr$, where $r=(x^2+y^2)^{\frac{1}{2}}$, c is a minimum predetermined distance to be maintained between said barycenters and k is a constant determined by the coarsest sampling desired at the boundaries of said array;
   (c) determining whether the point selected in step (a) is at a distance greater than $d(r)$ from its closest neighbor;
   (d) storing the coordinates of this point only if its distance from its closest neighbor is greater than $d(r)$;
   (e) repeating steps (a) to (d) until a predetermined number of points have been generated;
   (f) locating said sensor elements on said substrate with their barycenters at positions corresponding to said points, the area of each of said sensor elements being selected to provide isolation of said element from adjacent elements;
   (g) interposing transfer members between adjacent sensor elements on said substrate, and
   (h) connecting each of said sensor elements to one of said transfer members, a signal being generated at the output of said transfer member which corresponds to radiation falling on said sensor elements.

13. The method of making a sensing device as defined by claim 12 wherein said array of sensor elements consists of a plurality of groups of elements each including at least one sensor element, and wherein in step (h) the sensor elements of each group are coupled to an associated transfer member.

14. Apparatus for generating an output signal from an input image wherein said output signal is substantially free of detectable aliases, comprising
   an image pickup device for viewing said input image and transmitting radiation corresponding to said input image;
   an image sensing device including
     a substrate;
     an array of sensor elements for receiving said input image from said image pickup device, said sensor elements having their barycenters distributed at defined coordinate points on the surface of said substrate in a random, non-periodic pattern; and
     transfer members located on the surface of said substrate and interposed between said sensor elements, said transfer members being coupled to said sensor elements for generating analog signals having magnitudes corresponding to the intensities of the radiation incident on each of said sensor elements;

analog-to-digital converter means for converting said analog signal to a digital signal;

a position encoder having a plurality of storage addresses and an input coupled to the output of said analog to digital converter for receiving digital signals each of which has a value corresponding to the intensity of the radiation incident on a corresponding sensor element, said position encoder associating each of said intensity values with an address corresponding to the defined coordinate point of the sensor element receiving said radiation;

an interpolator coupled to the output of said position encoder for generating a plurality of signals corresponding to intensity values intermediate those stored in the storage addresses of said position encoder, the output of said interpolator also including the intensities of the stored signals; and memory means coupled to the output of said interpolator for storing the output of said interpolator and generating said output signal.

15. The apparatus defined by claim 14 wherein the barycenters of said sensor elements are separated by a distance which is greater than a predetermined number of pixel units.

16. The apparatus defined by claim 15 wherein said predetermined distance increases with the distance of said barycenters from a predetermined point on the surface of said substrate.

17. The apparatus defined by claim 14 wherein said array of sensor elements consists of a plurality of groups of elements each including at least one sensor element, and wherein the sensor elements of each group are coupled to an associated transfer member.

18. The apparatus defined by claim 17 wherein said transfer members are positioned on the surface of said substrate along serpentine paths interposed between said groups of sensor elements.

19. The apparatus defined by claim 14 wherein each of said transfer members is a vertical analog transport register.

20. The apparatus defined by claim 19 which further comprises a horizontal analog transfer register, the output of said vertical analog transport registers being coupled to the inputs of said horizontal register.

* * * * *